H. R. HUGHES.
ROTARY BORING DRILL.
APPLICATION FILED FEB. 24, 1914.

1,143,272.

Patented June 15, 1915.

Witnesses:
Geo. R. Ladson
C. M. Badger

Inventor,
Howard R. Hughes.
By Bakewell & Church, Attys.

UNITED STATES PATENT OFFICE.

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

ROTARY BORING-DRILL.

1,143,272.  Specification of Letters Patent.  Patented June 15, 1915.

Application filed February 24, 1914. Serial No. 820,677.

*To all whom it may concern:*

Be it known that I, HOWARD R. HUGHES, a citizen of the United States, residing at Houston, Texas, have invented a certain new and useful Improvement in Rotary Boring-Drills, of which the following is a full, clear, and exact description, such as will enable others skilled in the art to which it appertains to make and use the same.

This invention relates to rotary boring drills of the type that are equipped with rotatable cutters whose axes of rotation are inclined downwardly and inwardly toward the longitudinal axis or vertical center of the drill head.

One object of my present invention is to provide a cutter for a drill of the type mentioned which has a substantially frusto-conical shaped cutting portion of novel design that acts on the bottom of the hole, and an independent cylindrical-shaped cutting portion that forms an upwardly inclined wall at the edge of the bottom of the hole that has approximately the same angle as the angle of the spindle on which the cutter is rotatably mounted, and which is of sufficient area to cause a right-angle thrust on the spindle when the drill is in use, thereby reducing the tendency of the cutter to bind on its bearing, reducing the tendency of the edge portion of the cutter to wear down quickly, and also permitting the use of a straight bearing for the cutter which can be manufactured at a lower cost than the tapered bearings now generally used for the tapered cutters of rotary boring drills.

Another object is to provide a cutter of the character just described which is also equipped with a cutting surface that acts on the side wall of the hole so as to maintain the clearance for the drill head. And still another object is to provide a cutter for rotary boring drills that comprises a cylindrical cutting portion which is approximately concentric with the axis of rotation of the cutter, a substantially frusto-conical-shaped portion arranged at one side of said cylindrical portion and provided with sets of radially-disposed chisel-teeth of different pitch, and an oppositely tapered cutting portion on the other side of said cylindrical portion for removing the material from the side of the hole so as to maintain sufficient clearance for the drill head.

Figure 1:
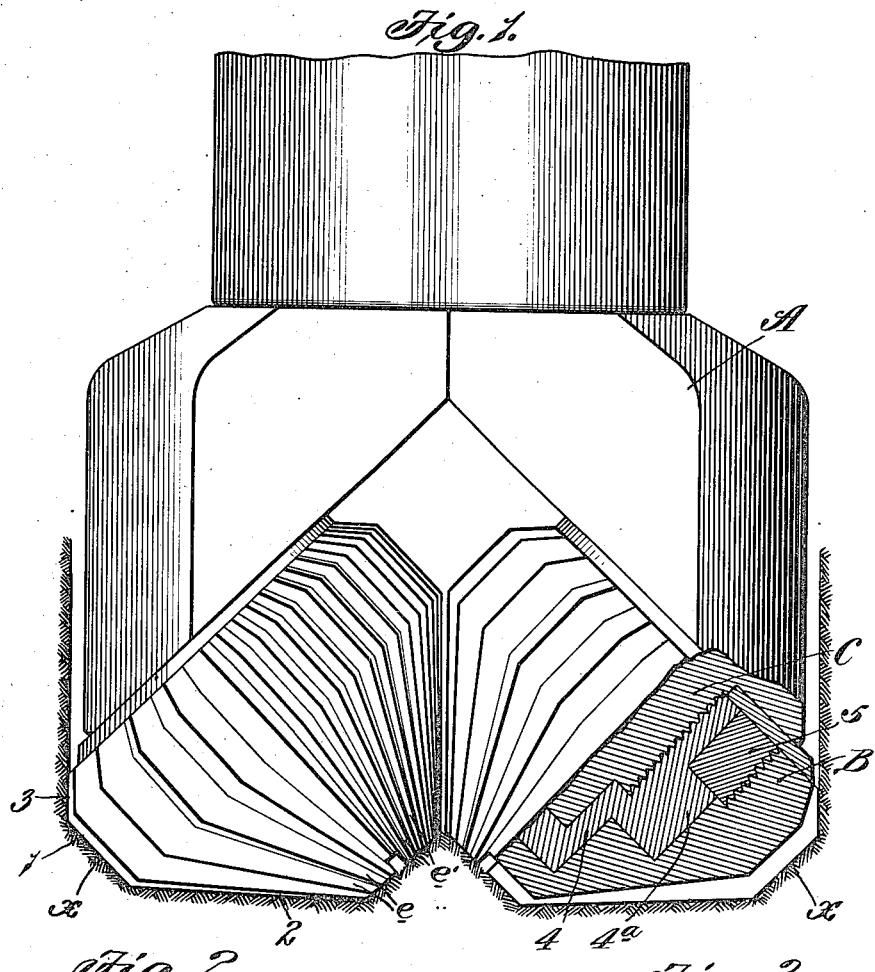
Figure 2:
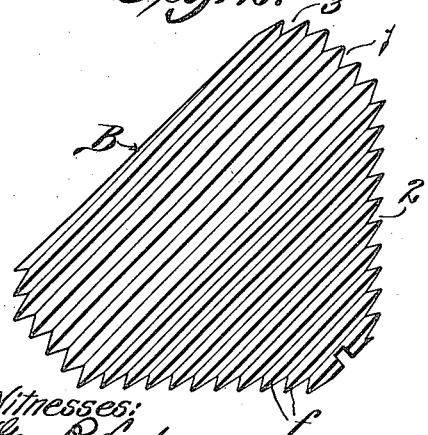
Figure 3:
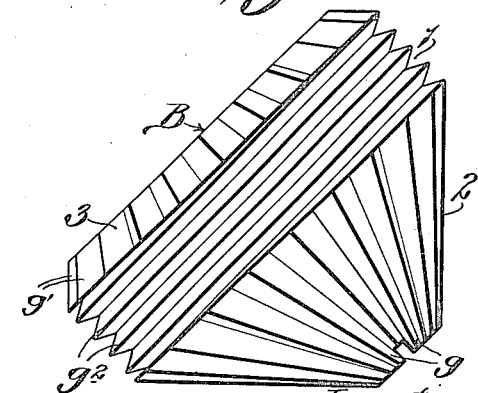

Figure 1 of the drawings is a side elevational view of a rotary boring drill equipped with cutters constructed in accordance with my invention; and Figs. 2 and 3 are elevational views of the cutters showing various kinds of cutting surfaces the cutters can be provided with.

Referring to Fig. 1 of the drawings which illustrates a type of rotary boring drill now in general use, A designates the head of the drill, and B designates two cutters rotatably mounted on said head in such a manner that their axes of rotation are inclined downwardly and inwardly toward the longitudinal axis or vertical center of the drill head. Each of said cutters is provided with a cylindrical-shaped cutting portion 1, a tapered cutting portion 2 of approximately frusto-conical shape arranged on one side of said cylindrical portion, and an oppositely tapered cutting portion 3 arranged on the other side of said cylindrical portion 1. When the drill is in operation the frusto-conical-shaped portions 2 of the cutters act on the bottom of the hole, and the oppositely tapered portions 3 of the cutters act on the side wall of the hole. The cylindrical-shaped portions 1 of the cutters are preferably concentric with the spindles C on which the cutters are mounted, and these cylindrical portions 1 form an upwardly inclined surface $x$ at the outer edge of the bottom of the hole which has approximately the same angle as the angle of the spindle C, the cylindrical portions 1 of the cutters being of sufficient area to cause a right-angle thrust on the spindles. As shown in Fig. 1 the upwardly inclined surface $x$ commences at a point within the marginal limits of the head and terminates in the side wall of the hole at a point beyond the marginal limits of the head. One advantage of such a cutter is that a straight bearing can be used with same, owing to the fact that the cylindrical-shaped portion 1 of the cutter forms a bearing surface $x$ at the bottom of the hole which is of sufficient area and arranged at such an angle that the thrust on the spindle is at right angles to the axis of rotation of the cutter. In other words, the cylindrical-shaped portion 1 of the cutter which is arranged at the base end of the conical-shaped portion 2, reduces the tendency of the cutter to bind on its bearing, and permits the use of a straight bearing which can be manufactured at less cost than the tapered bearings now generally used on rotary boring drills that are equipped with substantially frusto-conical-shaped cutters. Furthermore, such a cutter will not wear down quickly owing to the fact that it is not provided with a sharp edge or sharp angular portion at the point where the two portions of the cutter which act on the side wall and on the bottom of the hole meet.

Various means may be employed for retaining the cutters on their spindles, and while I have herein illustrated one type of mounting that is efficient and inexpensive to manufacture, I wish it to be understood that my invention is not limited to such a structure for the cutters could be mounted on the head in any suitable way without departing from the spirit of my invention.

In the structure illustrated in Fig. 1 a bearing or bushing 4 that is screwed onto the spindle C is provided with a laterally projecting flange $4^a$ that laps over a ring 5 onto which the cutter B is screwed or permanently connected in any other suitable manner, said ring 5 coöperating with the flange $4^a$ on the bushing to prevent the cutter from moving longitudinally of its bearing. The surfaces on the bushing 4 on which the cutter B rotates are cylindrical or parallel with the axis of rotation of the cutter, and therefore the bushing can be manufactured at a lower cost than a tapered bushing such as is now generally used with drills of the general type illustrated in Fig. 1. The bushing 4 preferably covers the end of the spindle C and thus forms an end-thrust-resisting bearing which can be renewed, and the laterally projecting flange $4^a$ on the bushing also forms an end-thrust-resisting bearing.

The particular type or kind of cutting surfaces that the different portions of the cutter are provided with is immaterial, so far as my broad idea is concerned, but I prefer to provide the approximately frusto-conical-shaped portion 2 of the cutter with sets of chisel-teeth $e$ and $e'$ that radiate from the apex or small end of the cutter, the teeth of the different sets being of different pitch so as to cause the material at the bottom of the hole to be cut finely or divided into small particles. In the form illustrated in Fig. 1 the cutting surface on the cylindrical-shaped part 1 of the cutter and on the oppositely tapered portion 3 is formed by continuations of the chisel-teeth $e$ and $e'$. Another type of cutting surface is illustrated in Fig. 2 wherein the reference character $f$ designates spiral teeth or a continuous spiral tooth that winds around the cutter numerous times over the independent portions 1, 2 and 3 of the cutter. In the cutter illustrated in Fig. 3 the cutting surface on the frusto-conical-shaped portion 2 of the cutter is made up of radially-disposed chisel-teeth $g$, and the cutting surface on the oppositely tapered portion 3 of the cutter is also formed by chisel-teeth $g'$. The cutting surface on the cylindrical-shaped portion 1 of the cutter consists of spiral teeth $g^2$ or a continuous spiral tooth that extends around the cutter a number of times, thus forming a relatively great cutting area.

Having thus described my invention, what I claim as new and desire to secure by Letters Patent is:

1. A rotary boring drill provided with a rotatable cutter whose axis of rotation is inclined downwardly and inwardly toward the vertical center of the drill head, said cutter having a substantially frusto-conical-shaped portion that acts on the bottom of the hole, and a cylindrical-shaped portion arranged at the base of said frusto-conical-shaped portion for forming an upwardly inclined surface adjacent the outer edge of the bottom of the hole whose lower edge lies in the vertical plane of the drill head, the cutting surface on said approximately frusto-conical-shaped portion being made up of sets of radially-disposed chisel-teeth of different pitch.

2. A rotatable cutter for rotary boring drills provided with a substantially frusto-conical-shaped cutting portion that acts on the bottom of the hole, an oppositely tapered portion that acts on the side wall of the hole, and a cylindrical-shaped cutting portion arranged intermediate said oppositely tapered portions for forming an upwardly inclined surface adjacent the outer edge of the bottom of the hole, the cutting surface on said frusto-conical-shaped portion being composed of sets of radially-disposed chisel-teeth of different pitch.

In testimony whereof I hereunto affix my signature in the presence of two witnesses, this 16" day of February 1914.

HOWARD R. HUGHES.

Witnesses:
L. A. GODBOLD,
C. E. REED.